April 5, 1927.
E. R. GURNEY
1,623,472
INDICATING DEVICE
Filed July 23, 1924
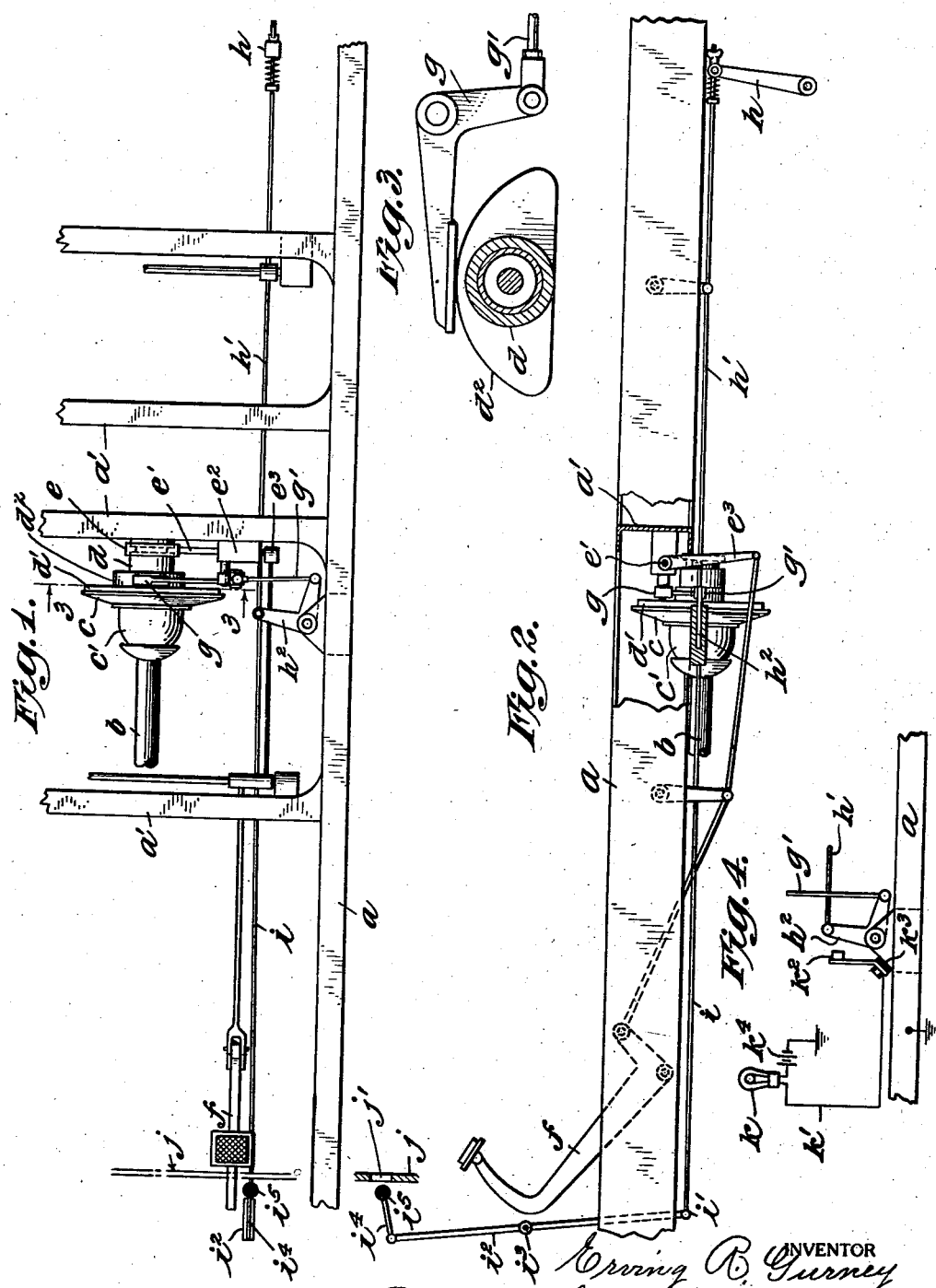

Patented Apr. 5, 1927.

1,623,472

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

INDICATING DEVICE.

Application filed July 23, 1924. Serial No. 727,724.

This invention relates to indicating mechanism adapted to give a visual indication of conditions at remote operating mechanism and has particular reference to a visual signal in proximity to the driver's seat in a motor vehicle which shall indicate the condition of the brakes at the wheels of the vehicle. In certain types of brake actuating mechanism the application of braking power to the propeller shaft serves to initiate the actuation of brake mechanism at one or more wheels of the vehicle. According to these types means are provided to frictionally engage an element carried with the propeller shaft whereby the turning effort impressed thereon by the revolution of the propeller shaft is taken off and transmitted to the wheels of the vehicle to initiate the setting of the brakes thereat. More particularly a sleeve slidable on the propeller shaft is adapted to be moved into frictional engagement with a disc rotatable with the propeller shaft, cam or wedge surfaces on the sleeve being adapted to cause the actuation through suitable connections of the brake actuating mechanism at the wheels of the vehicle. It will be apparent that there is no direct connection between the brake actuating lever at the driver's seat which serves to move the sleeve into frictional engagement with the disc and the cam actuating devices which initiate the brake setting operations and consequently upon setting the brakes the operator is unable to tell whether the brakes are in good condition or whether the brake bands have worn to a degree which renders them inefficient or inoperable. The present invention has for its object to provide a signal visible to the operator which shall indicate the condition of the brakes at the wheels of the vehicle. Accordingly suitable connections are provided between the brake actuating mechanism and a visual signal in proximity to the driver's seat whereby an indication of the extent of wear of the brake bands, for instance, is obtained. According to one aspect of the invention the brake rod is connected through a series of levers and connecting rods with an indicator which will become visible when the wear of the brake bands has exceeded a predetermined point. According to another aspect of the invention electrical means are availed of to afford the indication. In this instance, movement of the brake rod as a result of wear of the brake bands beyond the predetermined point closes an electrical circuit which lights a light visible to the operator of the vehicle. In order that the invention may be clearly understood and readily carried into effect the same will now be described more fully with reference to the accompanying drawings illustrating preferred embodiments thereof and in which:

Figure 1 is a view, in plan, showing so much of the chassis frame and brake actuating mechanism as is necessary to an understanding of the application of the invention thereto.

Figure 2 is a view in side elevation showing the brake mechanism of Figure 1 and the invention applied thereto.

Figure 3 is a fragmentary view taken in the plane indicated by the line 3—3 in Figure 1 and looking in the direction of the arrows and showing the means in which driving torque is availed of to actuate the brake mechanism.

Figure 4 is a view showing a modified form which the invention may take involving electrically actuated indicating means.

In the drawings the longitudinal side frame member $a$ of the chassis has connected thereto at appropriate intervals a plurality of transverse re-enforcing elements $a'$ as is customary in the art. Certain of these transverse elements support the propeller shaft $b$ rotated in known manner from a prime mover not shown. Carried with the propeller shaft is a disc $c$ forming an element of the universal joint $c'$. Freely rotatable upon the propeller shaft $b$ is a sleeve $d$ formed with a flange $d'$ at one end thereof. In order that the flange $d$ may be brought into frictional engagement with the disc $c$ the sleeve is adapted to be engaged by the arms of a forked lever $e$ carried on the rock shaft $e'$ journaled as at $e^2$ to one of the cross frame members $a'$ of the chassis. An arm $e^3$ rigidly carried on the end of the rock shaft is connected by a suitable series of links and levers with the actuating lever $f$. It will be apparent that upon depressing the lever $f$ the fork $e$ will cause the frictional engagement of flange $d'$ with the disc $c$ to cause the flange to rotate therewith. Also carried on the sleeve $d$ is a cam surface $d^2$ which, upon rotation of the sleeve $d$, is adapted to engage an arm of the bell crank lever $g$ connected through a suitable series of links and levers with brake actuating mechanism at the wheels of the vehicle, an element of such brake actuating mechanism being indicated at $h$ in Figure 2. It will be obvious from the foregoing description of the brake actuating mechanism that no indication of the effectiveness of the brake mechanism will be apparent to the operator upon actuation of the lever $f$. In order therefore to furnish an indication of the condition of the brakes the forward end of brake rod $h'$ is connected in any appropriate manner to a link $i$ extending forwardly in proximity to the operator of the vehicle and connected at its forward end as at $i'$ to a lever $i^2$ pivoted as at $i^3$ in some convenient manner with respect to the dash $j$ of the vehicle. The end of the lever opposite to the connection $i'$ is provided with an arm $i^4$ carrying an indicator such as the ball $i^5$. This ball may be conveniently colored red and may be adapted to pass through an aperture $j'$ in the dash upon extended movement of the lever $i^2$. Lever $i^2$ and arm $i^4$ are so proportioned that when the brakes are in proper condition the movement of brake rod $h'$ during setting of the brakes will not be of an extent sufficient to cause the protrusion of the indicator $i^5$ through the aperture $j'$ in the dash. As the brakes wear, however, the movement of brake rod $h'$ in the direction of its axis will be increased causing appropriate movement of the lever $i^2$, in a manner which will be comprehended to cause the appearance of the ball $i^5$ in the aperture $j'$. Thus the appearance of the red ball through the aperture will indicate to the operator that the brakes of the vehicle require adjustment.

In Figure 4 there is indicated a modification of the invention in which movement of the brake rod $h'$ passed a predetermined point will serve to close an electrical circuit. In the illustrated modification a light $k$ may be carried in any convenient manner upon, for instance, the dash of the vehicle and may be connected through the conductor $k'$ with the contact $k^2$ insulated by means of non-conducting material $k^3$ from the chassis frame $a$. Lamp $k$ is in circuit with a source of electrical current $k^4$ and may be grounded in a manner which will be readily understood upon the chassis frame. The bell crank lever $h^2$, one arm of which is connected to the brake rod $h'$ and the other arm of which is connected through the link $g'$ with the bell crank $g$ is, of course, in electrical contact through its metallic connections with the chassis $a$. By suitably positioning the contact $k^2$ normal movements of the brake rod $h'$ may be permitted but when the movement of the brake rod exceeds a predetermined point due to the necessity for adjustment of the brakes the arm of bell crank $h^2$ is brought into engagement with the contact $k^2$ to close an electrical circuit and light the lamp $k$. This lamp may be colored red so as to give a warning signal to the operator that the brakes in the vehicle require adjustment.

It will thus be seen that a visual indication has been provided for the operator which will indicate when the brakes of the vehicle require adjustment even though such indication is not possible through the mechanism which initiates the setting of the brakes.

While the invention has been illustrated as applied to the brakes of a motor vehicle it will be apparent that its applicability is not limited to such use but is equally effective in any situation in which remote operating mechanism is actuated from a source of power initiated through independent means. Various modification of the structure hereinbefore described and illustrated will occur to those skilled in the art and no limitation is intended except as indicated in the appended claims.

What I claim is:

1. In combination, a rotating element, friction means to engage the element, means for moving the friction means into engagement with the element, visual indicating means observable from a position in which the moving means is operated, and means to actuate the indicating means when the friction means is moved a predetermined distance toward engaging the element.

2. In combination with a vehicle, a rotating element thereon, friction means to engage the element, means for moving the friction means into engagement with the element, means mounted on the vehicle dash for giving a visual indication, and means to actuate the indicating means when the friction means is moved a predetermined distance toward engaging the element.

3. In combination, a power shaft, a disc carried with said shaft, a rotatable sleeve formed with a flange and a cam, a lever, one arm of said lever so disposed as to be engaged by the cam upon rotation of the sleeve, remote brake actuating mechanism connections between the other arm of the lever and said remote brake actuating mechanism, remote indicating means, and connections between said first named connections and said indicating means.

4. In combination, braking means, means to actuate the same, and means observable from an actuating position to determine the effectiveness of the braking means.

This specification signed this 17 day of July, A. D. 1924.

ERVING R. GURNEY.